June 12, 1934.　　　　LE ROY W. SLY　　　　1,962,329

COMBINATION SAWING AND EDGING MACHINE

Filed Feb. 18, 1933　　　4 Sheets-Sheet 1

INVENTOR
LeRoy W. Sly

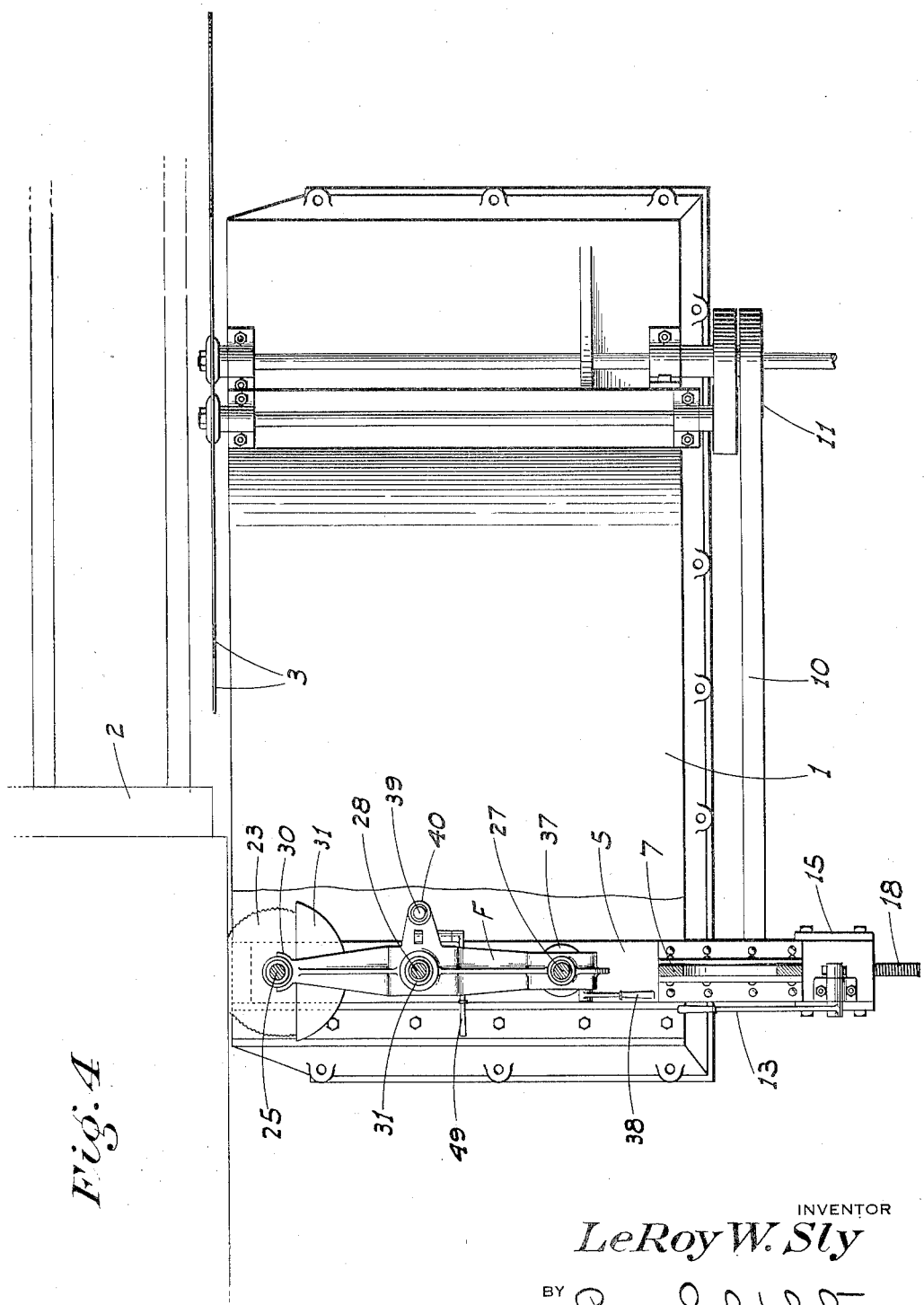

Patented June 12, 1934

1,962,329

UNITED STATES PATENT OFFICE 1,962,329

COMBINATION SAWING AND EDGING MACHINE

Le Roy W. Sly, Chico, Calif.

Application February 18, 1933, Serial No. 657,412

10 Claims. (Cl. 143—38)

This invention relates to the lumber industry, and particularly to the cutting of boards from the logs as the latter are taken from the pond etc. At present the log is advanced against rotary rip saws to form the rough boards which are then taken to a separate machine to be edged. These separate sawing machines take up considerable floor space, while the handling of the boards between the initial cutting operation and their subsequent edging inevitably calls for the use of a certain amount of additional hand labor over that necessary to operate the machines themselves.

The principal object of my invention is to avoid the above objectionable features by providing, as a compact unit, a machine in which both the vertical rip saws and the horizontal edge saws are combined in such a manner that the two operations are performed with one movement of the log and simultaneously.

The combining of the two major operations in lumber manufacture by means of my improved machine results in a perfectly balanced mill regardless of the amount of power available to operate the various machines. When the board cutting and edging machines are separate, as in the present type of mill, the simultaneous operation of these separate machines prevents efficient operation of either one when the power is relatively small. With my improved arrangment, the sawyer has complete and direct control over these major power consuming machines of the mill, and is thus able to operate them simultaneously or alternately, and adjust their speed or the load thereon, to conform to the available power.

These objects I accomplish by means of such structure and relative arrangement of parts as will fully appear by a perusal of the following specification and claims.

In the drawings similar characters of reference indicate corresponding parts in the several views:

A further object is to arrange the edging saws so that they may be easily adjusted by the sawyer so that their height from the bottom of the log and its carriage, or the spacing relative to each other, may be altered separately or together selectively in various ways, as the cutting conditions presented by the individual logs may require.

The edging saws may also be adjusted horizontally to different positions relative to the vertical saws so that the edging operations may be carried out in conjunction with or separately from the board cutting operation, or so that they may remain idle or in a non-functioning position as may be desired.

A still further object is to provide a machine of this character so constructed that a high degree of precision and accuracy in edging operations is obtained, so that the boards are all edged to such accurately uniform widths that subsequent sizing is unnecessary.

Still another object is to arrange the edging saws so that they engage the log ahead of the vertical rip saws so that the board to be formed is being edged before it is actually cut, thus avoiding the necessity of a separate mechanism to hold the board in proper engagement with the edging saws. By means of my improved machine therefore not only is floor space in the mill conserved, but the cost of operations generally is cut down on account of the fact that the handling of the lumber is reduced and fewer men are needed to conduct the various operations.

Fig. 4 is a top plan view of the structure, partly broken away.

Figure 1:
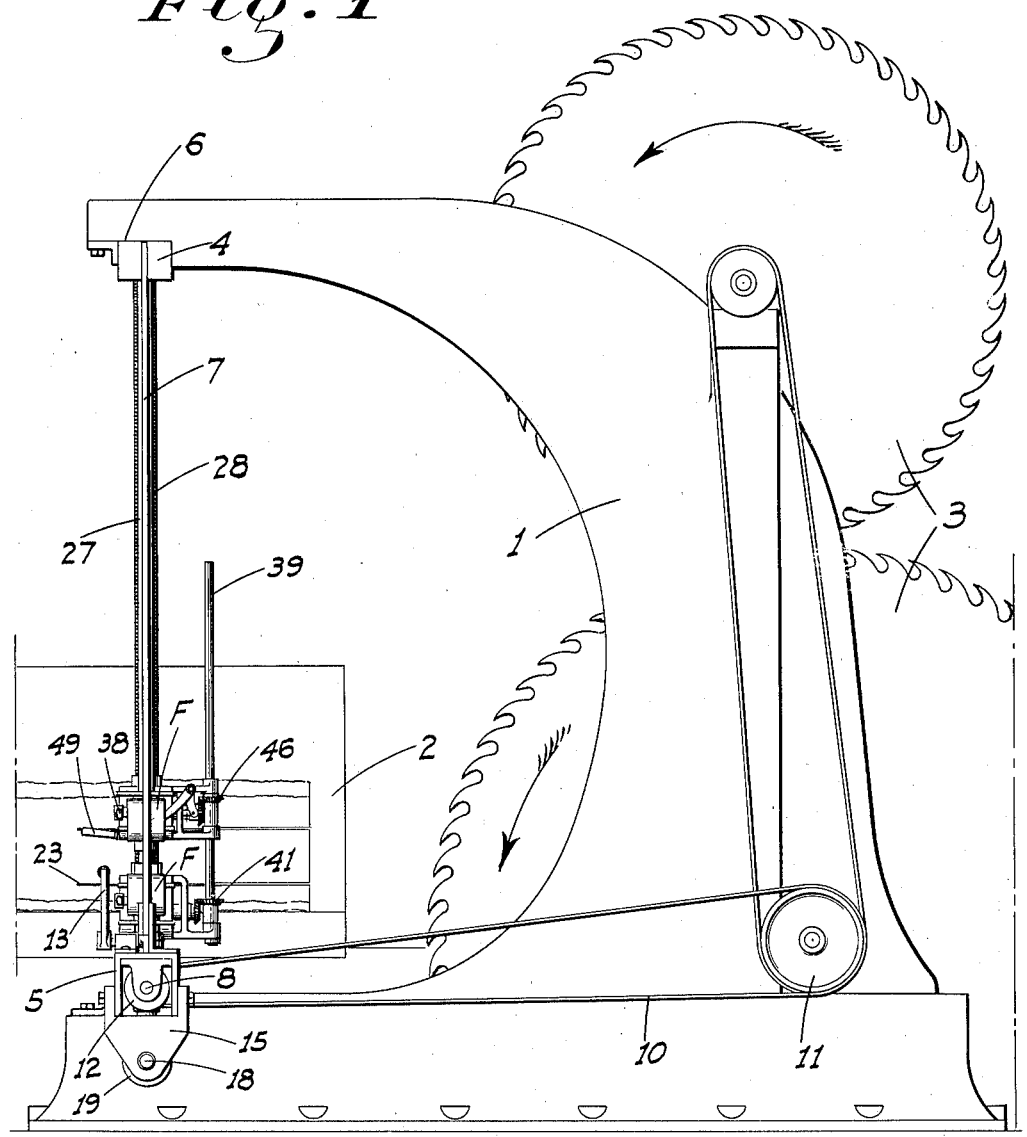
Fig. 1 is a side view of the complete machine.

Referring now more particularly to the characters of reference on the drawings, the numeral 1 denotes the main frame of the machine which is disposed to one side of the log supporting and advancing carriage 2, which is of common form and which I do not alter in any way. Separate transversely alined rotary rip saws 3 are mounted in vertical alinement and cooperating relation on the side of the frame adjacent the carriage so as to engage a log thereon.

Mounted on the frame 1 a certain distance ahead of the saws 3 is the edging structure. The frame of this structure comprises top and bottom frame members 4 and 5 respectively slidably mounted for horizontal movement transversely of the log carriage and the saws in guideways 6 formed at the top and bottom of the frame 1. The members 4 and 5 are rigidly connected at the end farthest from the carriage by a frame plate 7 or similar rigid member.

Journaled in and extending lengthwise of the lower member 5 (which is hollow) is a shaft 8 having adjacent one end a relatively long pulley 9 thereon. This pulley is engaged by a belt 10 extending rearwardly to a connection with a pulley 11 mounted on the shaft of the lower saw 3 as shown in Fig. 1. This saw shaft is the primary power shaft of the machine and is driven in any suitable manner. The shaft 8 is constantly driven as long as the machine is in operation and furnishes the power for the different mechanisms and movements hereinafter described.

Figure 2:
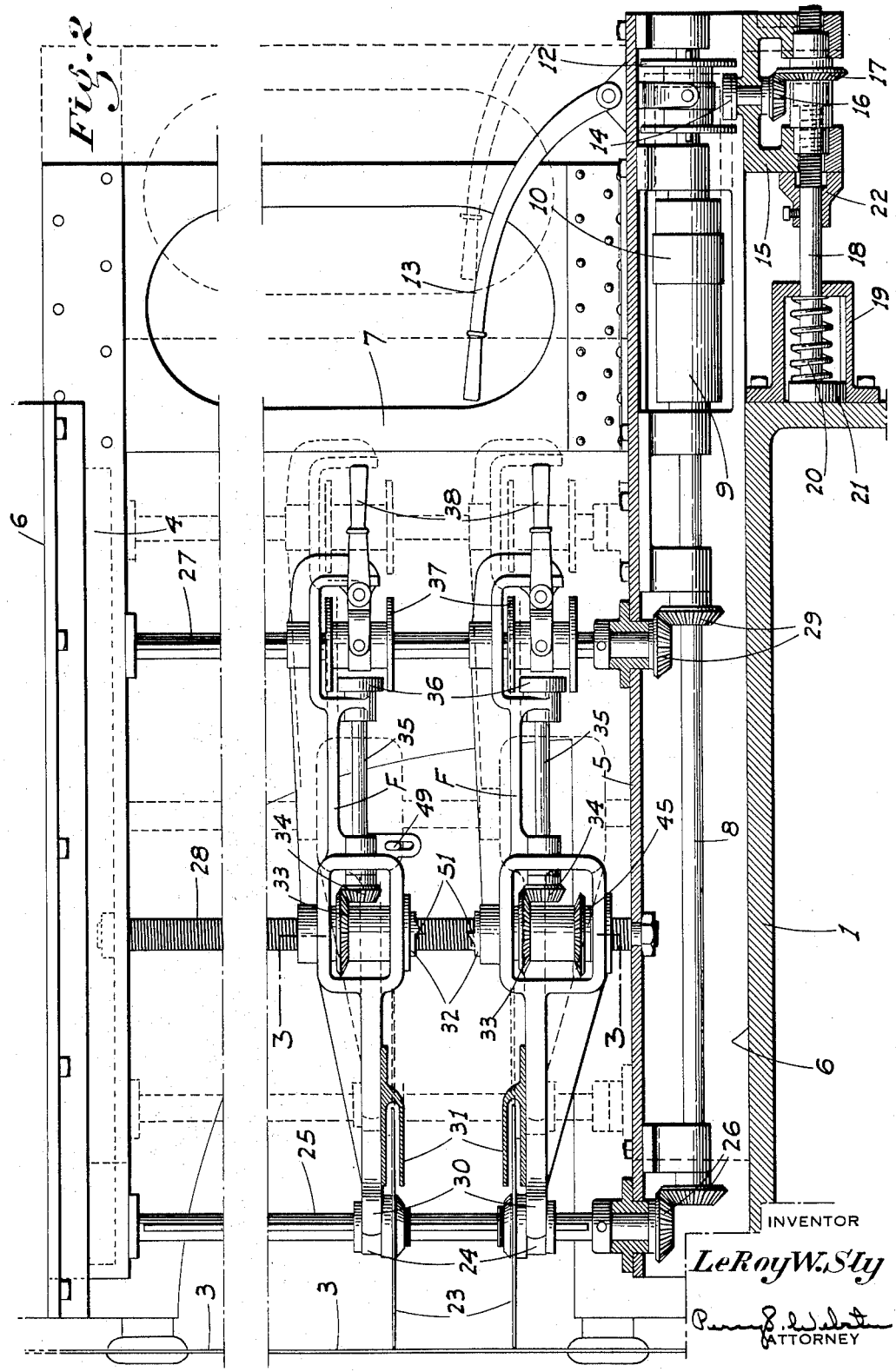
Fig. 2 is a front view partly in section of the edging saw assembly.

Splined on the shaft 8 outwardly of the pulley 9 is a double friction disk unit 12, controlled in its movements along the shaft by a hand lever 13. A vertical friction roller 14 projects between the faces of the disk unit to cooperate with either one of the same selectively, depending on the movement of said unit along the shaft. This roller is turnably mounted in a support 15 depending from and rigidly secured to the adjacent end of the member 5, which is outwardly of the adjacent side of the frame 1 as shown in Fig. 2. A bevel pinion 16 is connected to the roller 14 which engages a bevel gear 17 mounted and held against axial movement in the support 15 and threaded on a non-turnable horizontal screw shaft 18. This shaft projects from the adjacent side of the frame 1 and is disposed parallel to the shaft 8. It is held against rotation in a housing 19 secured to the frame 1, and is yieldably held against movement outwardly of the frame 1 by a compression spring 20 in the housing and engaging the head 21 on the adjacent end of the shaft 18. An adjustable stop collar 22 on said shaft between the housing and the support 15 limits the movement of the support 15 and consequently the member 5 in the direction of the saws 3; the shaft 18 being incapable of movement in that direction on account of the head 21 which bears against the frame 1 as shown in Fig. 2.

By means of this arrangement it will be seen that the rotation of the roller 14 in one direction or the other causes the member 5 and of course all parts connected thereto to move lengthwise of the guides 6 in one direction or the other, as governed by the selective manipulation of the lever 13. The spring 20 enables the assembly to move away from the log without damage to the edger saws and other parts in the event that there should be any interruption to the normal flow of power to said saws. The spring therefore functions as a safety device which normally exerts sufficient pressure to hold the edger saws in their proper working position under normal working conditions, but which as stated allow said saws to recede or back away from the log if they should cease to be driven and hence fail to exert any cutting action on the log.

The purpose of this adjustment of the frame assembly is to enable the position of the edger saws 23 relative to the saws 3 to be altered. These saws 23 are horizontally disposed and are arranged in superimposed relation on collars 24 splined on a vertical shaft 25. This shaft extends between and is journaled in the members 4 and 5 at the end opposite the plate 7, or at that end nearest the saws 3. The lower end of the shaft 25 is constantly driven from the shaft 8 by interconnecting bevel gearing 26.

The members 4 and 5 support another rotary shaft 27 and a fixed non-rotating screw shaft 28, all said shafts being in alinement and the screw shaft being disposed between the shafts 25 and 27. The shaft 27 is constantly driven from the shaft 8 by suitable gearing connections 29. Frames F—one for each edger saw—embrace the shafts 27 and 28 and have yokes 30 at one end engaging the collars 24 of the corresponding saws 23. Combination guard and sawdust catchers or deflectors 31 are mounted on the frames F about the saws 23 so as to protect the operator and deflect the sawdust back against the log moving toward the rip saws so that said dust may fall into the main pit under the saw carriage.

Figure 3:
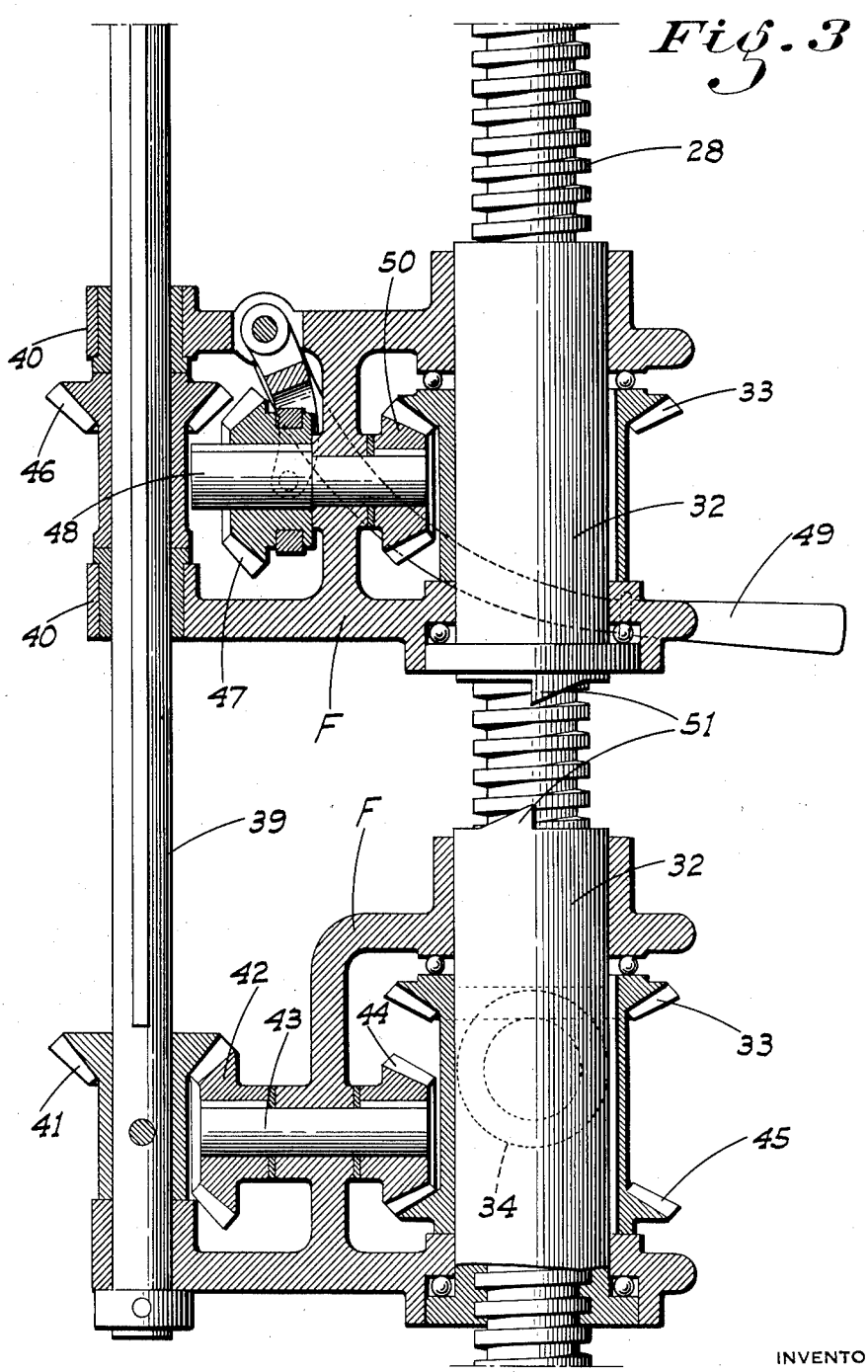
Fig. 3 is an enlarged transverse section on the line 3—3 of Fig. 2.

Turnable sleeves 32 on which the frames F are supported (see Fig. 3) are threaded on the shaft 28. Bevel gears 33 are secured to these sleeves and are engaged by pinions 34 mounted on horizontal shafts 35 journaled in the respective frames F. Each shaft 35 at its outer end carries a friction roller 36 projecting between the adjacent faces of a double friction disk unit 37 for selective driving engagement therewith. This unit is splined on the shaft 27 and its movement in either direction is controlled by a hand lever 38 mounted on the corresponding frame F. The lever and the gearing of this mechanism are arranged so that when the lever is raised the sleeve 32 will be driven so as to raise the frame F and the saw carried thereby, and when the lever is lowered the saw will be lowered likewise. Since each frame is separate from the other and has its own control mechanism the frames and their saws may be raised or lowered independently of each other to any desired degree, thus enabling the saws to be positioned in any desired spaced relation to each other and to the log supporting surface of the carriage 2.

I have also provided a means whereby the edging saws may be moved up or down as a unit and while maintained in definitely spaced relation to each other; or may be moved away from or toward each other at the same speed, or symmetrical to a central plane therebetween.

These additional movements may be carried out in various ways but for illustration I show the following arrangement. Journaled in the lower frame F back of the shaft 28 and held against axial movement is a vertical shaft 39, which projects upwardly for a certain distance. Said shaft slidably and turnably extends through bearing sleeves 40 on the upper frame F. A bevel pinion 41 fixed on said shaft adjacent its lower end is engaged by a similar pinion 42 secured on a shaft 43 journaled in the lower frame F. The shaft 43 carries another pinion 44 engaging a bevel gear 45 fixed with the adjacent gear 33 and the corresponding sleeve 32. A bevel pinion 46 is splined on the shaft 39 between the sleeves 40 so as to be incapable of axial movement and is engaged with a pinion 47 splined on a shaft 48 journaled in the upper frame F. The pinion 47 may be moved into or out of engagement with the pinion 46 by a shifting lever 49 mounted on the upper frame F and projecting to a position convenient of operation by the sawyer standing in front of the assembly. A pinion 50 is fixed on the shaft 48 and constantly engages the adjacent gear 33. The adjacent ends of the sleeves 32 are provided with cooperating clutch teeth 51 arranged to drive in one direction only.

In the operation of this structure if it is desired to raise the saws together, the pinion 47 is left disengaged from the pinion 46 and the control lever 38 of the lower saw assembly is manipulated to raise the same. As soon as the sleeve teeth 51 engage each other the upper sleeve will be rotated with the lower and of course in the same direction, and both assemblies will be raised together without any further altering of their spaced relation. If the saws are to be lowered the lever 38 of the upper assembly is manipulated to cause the same to be lowered so that its sleeve 32 will engage and impart rotation in the same direction to the lower sleeve.

If the saws are to be symmetrically separated or brought toward each other, the pinion 47 is thrown into engagement with the pinion 46. The upper and lower sleeves 32 are then connected so that rotation of one sleeve in one direction, as had by suitable manipulation of the corresponding control lever 38, will cause the other sleeve to move at the same speed in the opposite direction. The spacing between the saws will be thus symmetrically altered relative to the plane of a central line between the saws.

When the edging is being done in conjunction with the sawing of the boards the stop 22 is set so that the periphery of the saws 23 is in alinement with the plane of the saws 3 as shown in Fig. 2. If edging operations are not to be carried out the edger saw assemblies are retracted in the manner previously described. If edging operations are to be done separately from the board sawing operations the stop 22 is adjusted so that the saws 23 project beyond the plane of the saws 3, so that the boards being edged may run past the saws 3 without being acted on by the same.

This control of the edger saws also enables the machine to be used to conform to the available power, in the event that this is insufficient to enable both sets of saws to operate under load at the same time. In such cases, the edger saws are advanced relative to the vertical saws to make edge cuts in the log with the movement of the latter, the log carriage being shifted back from the vertical saws so as to pass clear of the same.

Prior to the subsequent stroke of the log carriage, the edger saws are backed away from the same and the carriage is shifted forward so as to cause the vertical saws to engage the log and cut an already edged board therefrom. The two necessary operations are thus still performed on the log, but in alternating instead of simultaneous order, and only one set of saws is under load at a time.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An edging saw structure comprising spaced saws, a driven shaft on which said saws are slidably splined, frames separately supporting the saws, means applied to the frames to move them separately in either direction along the shaft, and means cooperating with said first named means to move the frames along the shaft simultaneously but in opposite directions and in positive symmetrical relation to a given plane between the saws.

2. An edging saw structure including a vertical shaft, a saw mounted on and driven by said shaft, a horizontally movable carriage on which said shaft is supported, a non-turnable screw shaft extending parallel to the plane of movement of the carriage, a member turnably mounted on the carriage and threaded on the screw shaft, means to rotate the member and means holding the member against axial movement on the carriage, means preventing movement of the screw shaft in one direction and means yieldably resisting movement of said shaft in the opposite direction.

3. An edging saw structure including a vertical shaft, a saw mounted on and driven by said shaft, a horizontal carriage projecting from and in which the saw is turnably supported, a vertical non-rotatable screw shaft, a sleeve turnably mounted in the carriage and engaging the screw shaft, a horizontal driven shaft mounted in a fixed position on the carriage and driving said saw shaft, and means to connect the sleeve in driving relation with the driven shaft irrespective of the change of distance of the sleeve from the driven shaft had with the movement of the sleeve along the screw shaft.

4. An edging saw structure including a driven shaft, spaced saws slidable on and driven by said shaft, separate frames supporting said saws, a non-rotatable screw shaft parallel to said driven shaft, sleeves turnably mounted in the frames and engaging the screw shaft, another driven shaft, separate means to separately and selectively rotate the sleeves from said other driven shaft, and separate selectively operable means connecting the sleeves to cause one sleeve to turn in a direction opposite to the direction of turning of the other sleeve with the rotation of the latter.

5. An edging saw structure including a driven shaft, spaced saws slidable on and driven by said shaft, separate frames supporting said saws, a non-rotatable screw shaft parallel to said driven shaft, sleeves turnably mounted in the frames and engaging the screw shaft, separate means to separately and selectively rotate the sleeves, driving means connecting the sleeves to cause them to rotate in opposite directions, and a clutch device in said driving connections.

6. An edging saw structure including a driven shaft, spaced saws slidable on and driven by said shaft, separate frames supporting said saws, a non-rotatable screw shaft parallel to said driven shaft, sleeves turnably mounted in the frames and engaging the screw shaft, separate means to separately and selectively rotate the sleeves, the adjacent ends of the sleeves projecting from the corresponding frames, and cooperating drive elements on said ends of the sleeves arranged for engagement when the frames move toward each other a predetermined distance.

7. An edging saw structure comprising spaced axially parallel saws, selectively operable means to move the saws axially in either direction separately, and additional selectively operable means to cause said saws to move axially in opposite directions simultaneously and in positive symmetrical relation to a given plane between the saws.

8. In a sawmill, an edging saw, a carriage on which said saw is mounted, a fixed frame on which said carriage is slidably supported, means between the carriage and frame to adjust the carriage in opposite directions selectively, and means included with said adjusting means to yieldably resist movement of the carriage beyond a predetermined point in one direction.

9. A structure as in claim 8, with a friction drive for said adjusting means.

10. An edging saw structure comprising a non-rotatable screw shaft, spaced sleeves threaded on the shaft, separate frames in which said sleeves are mounted projecting from the shaft, driven edging saws supported on said frames, means applied to one sleeve to rotate the same in either direction selectively, a shaft parallel to the screw shaft mounted against axial movement on the frame of said one sleeve, constantly engaged gearing connections between said last named shaft and the corresponding sleeve, driving connections between the last named shaft and the other sleeve, said connections including a gear splined on said shaft and mounted against axial movement on the frame of the other sleeve and a clutch device, and means to operate said device at will.

LE ROY W. SLY.